June 19, 1928.
E. G. SHALKHAUSER
RADIODIAL
Filed Nov. 3, 1926
1,673,888
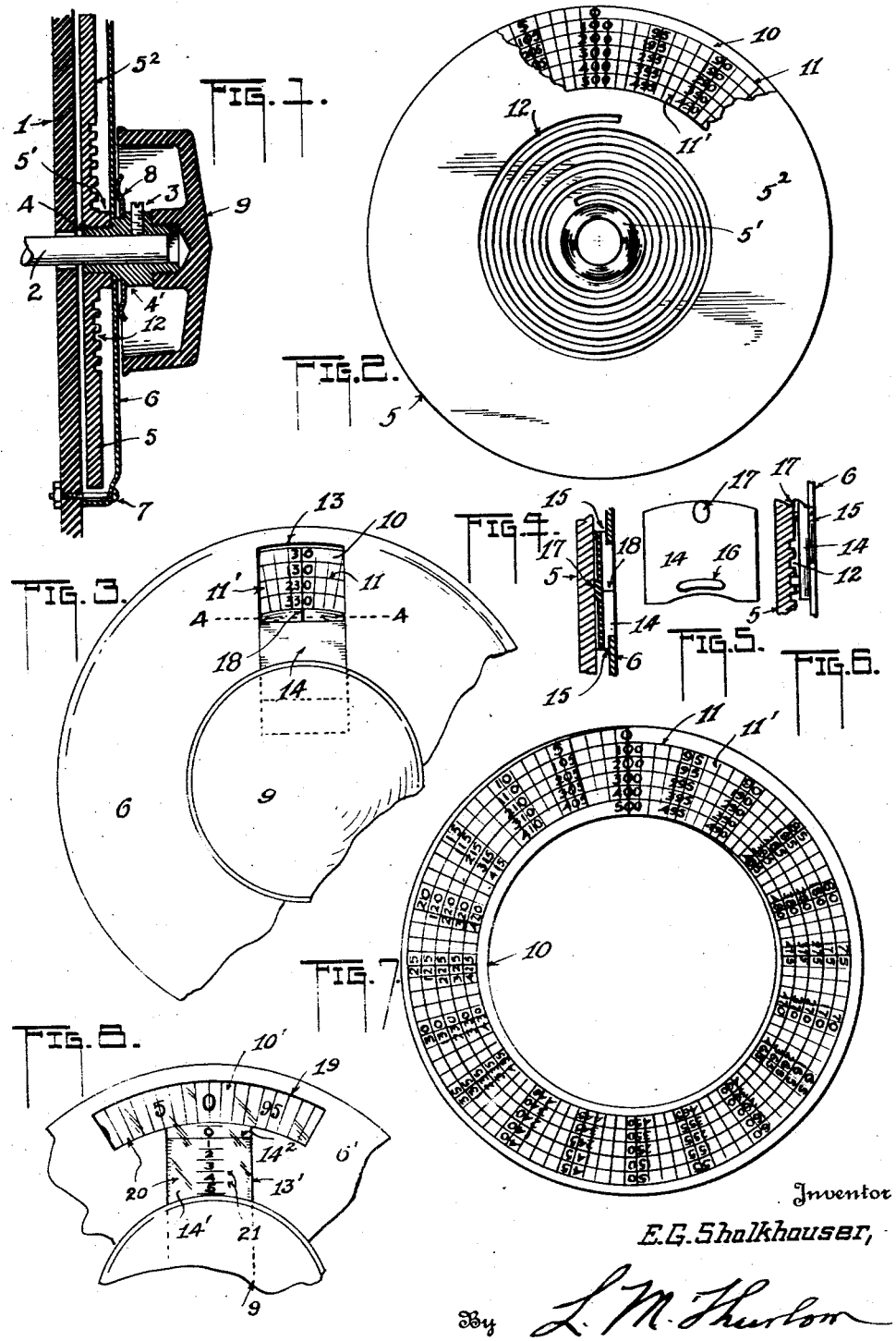
Inventor
E.G. Shalkhauser,
By L. M. Thurlow
Attorney Patented June 19, 1928.

1,673,888

UNITED STATES PATENT OFFICE.

ERIC G. SHALKHAUSER, OF PEORIA, ILLINOIS.

RADIODIAL.

Application filed November 3, 1926. Serial No. 145,943.

This invention pertains to radio dials. More particularly it has to do with dials for operating tuning condensers of radio sets.

I show in Letters Patent No. 1,612,473 issued to me Dec. 28, 1926 by the United States Patent Office, a peculiar type of variable condenser for radio sets whose rotor requires a number of full revolutions in order to bring in stations extending over a broad wave-band. Such a condenser calls for an arrangement that will provide for quickly finding any station position upon a dial around whose face the numbered divisions are spread one or more times to correspond with positions of the rotor throughout the number of revolutions through which it travels.

An object of my invention, therefore, is to employ in connection with the mentioned type of condenser means whereby any given dial reading and the number of rotations of the dial will be indicated quickly and with exactness.

Another object is the provision of mechanism for imparting movement to an indicator shifted radially with respect to a dial that is required to be moved through a number of revolutions, in order that a station point on said dial will be indicated as well as the extent of rotation of the dial during the tuning period.

Still another object is that in tuning to a known wave-length reading, involving more than one revolution of a dial, such reading can be quickly produced by the inclusion of an indicator caused to move in a radial direction across the dial to a station denoting position.

That my invention may be properly understood I have provided the accompanying drawing illustrating a preferred form of mechanism though it is to be understood that I may use equivalents of what is described and shown.

Figure 1 is a transverse section of my dial as I prefer to construct it.

Figure 2 is a plan of the front side of a rotatable dial-plate.

Figure 3 is a front elevation of part of the assembled device.

Figure 4 is a transverse section of the dial-plate and a cover or housing for the same, together with an indicator, the whole being produced on line 4—4, Figure 3.

Figure 5 is a rear elevation of the indicator shown in Figures 3 and 4.

Figure 6 is a side elevation of the same illustrating its relation to the dial-plate, shown in section.

Figure 7 is a plan of a dial, and

Figure 8 is a slightly modified form of what is shown in Figure 3.

In Figure 1 the numeral 1 designates the usual panel of a radio receiving set, for example, through which projects the shaft 2 of a condenser, not shown of the type herein referred to. Affixed to the shaft by means of a screw 3, for example, is a sleeve 4 to whose inner end is suitably secured what I shall term a "dial-plate" 5 having a hub 5', said sleeve extending through a cupped cover-plate or housing 6 adapted to be clamped against the panel 1 by one or more bolts 7, for example, but one being shown. A spring washer 8 is preferably employed to bear against the cover-plate 6, being backed by a shoulder 4' of said sleeve 4, the latter being reduced in diameter at its outer end and threatened to receive an operating knob 9 used for turning the shaft and dial-plate, and the condenser, not shown.

With a condenser of the peculiar type referred to it is necessary to provide a dial that will admit of readings at any position of such condenser whether that member is turned through one or several revolutions. In the common form of dial, which operates within one revolution of a condenser, the indicating numbers are placed in a circle at the margin usually running from 0 to 100. In the present instance, however, the dial must rotate a number of times to correspond with those of the several turns of the condenser and must have indicating numbers greatly in excess of the usual 100, being as high in this case as 500, though more may be used if desired. In order that the increased number of figures and division lines may be accommodated they are arranged spirally upon the dial. In Figure 7 the character 10 represents a ring of paper, celluloid, or other suitable material to form a dial support adapted to be mounted on the front surface $5^2$ of the dial-plate 5. Upon this support the characters 0 to 500 are shown, being arranged within a spirally formed space created by the spirally extending line 11, it being observed that the terminal number 500 lies in line radially with the "0" and that the intervening figures are 100, 200, 300, and 400, it being noted, also, that any given number in the first full turn of the spiral is increased by the value of one-hundred in succeeding turns of such spiral. Radial lines 11' furnish divisions between the several sets or columns of figures over the entire dial.

In the front forward face of the dial-plate 5 is a spirally cut groove 12 forming an abutment, which in the present instance happens to be a left-hand one, its direction of advancement depending upon the form of condenser in use. The terminals of the groove may be substantially in line, radially, with the "0" by preference as may be seen in Figure 2.

In the cover-plate 6, Figure 3, is a slot 13 forming a window through which to view the dial 10 carried by the said dial-plate 5. The parallel edges of the cover-plate at said window 13 form guides for an indicator 14 taking the form of a slide, Figures 4, 5 and 6. The said indicator, Figure 4, is relieved at opposite edges at 15 forming angles to receive the said edges of the cover-plate as shown in Figure 4, the face of the indicator thus preferably lying flush with the outer face of said cover-plate.

Projecting from the rear face of the indicator near its lower end is a tooth or segment 16 adapted to engage in the groove 12 of the dial-plate, there being an extended portion 17 projecting from said rear face of the indicator near the upper end to lie against the dial-plate, said portion and said segment serving to maintain the indicator in the said slot or window 13, in addition to the fact that the said segment 16 is operated by the dial-plate to shift the indicator with respect to the dial and radially thereof due to the position of the slot 13.

The spacing of the turns of the groove 12 and those of the line 11 of the dial are substantially equal so that in the rotation of the dial the edge of the indicator, which abuts on said line, will always lie on said line in any position of the dial. For example, in Figure 3 the indicator lies just below the exposed space carrying the number "330." Rotation in either direction will cause the indicator to follow the line 11 and at all times be just below any figure or division exposed at the window. If the rotation is toward the left one full revolution, for example, the indicator will cover "330" and lie just below "230" on the line, and so on.

While I have shown a separately printed dial as 10, Figure 7, for attachment to the dial-plate 5 it is to be understood that I may suitably engrave or otherwise produce the figures and division lines directly upon the dial-plate.

The walls at the ends of the groove 12 may act as stops for the dial by striking upon the tooth or segment 16 of the indicator 14, limiting the dial movement at 0 and 500.

It is to be seen that where a dial must be turned through more than one revolution provision must be made for a continuous reading of dial numbers and divisions which, naturally, must be arranged spirally, in consequence of which an indicator must be made to follow the spiral through its engagement with the groove 12, or the equivalent of the groove, giving exact indications at any point on such dial.

In Figure 8 is shown a slightly modified form of the window arrangement of Figure 3 wherein 6' is the cover-plate having an arcuate opening 19 communicating with the window 13'. The indicator is designated at 14' and lies beneath a transparent covering 20 upon which the Figures 0, 1, 2, 3, 4 and 5 are arranged in a vertical line and each over an indicating mark 21, each mark corresponding with the particular position of the dial as regards number of revolutions. The upper edge of the indicator when placed opposite or beneath the line 21 under "0" with the "0" of the dial placed in the relation shown in the arrangement is in what may be termed the starting position.

In this form of dial there is but one row of divisions or from 1 to 100 similar to the form in common use. The indicator 14 corresponds to and is operated in some such way as described with reference to the indicator 14 of the other figures.

In one full rotation of the dial 10' the edge $14^2$ of the indicator will have traveled from one of the marks or lines 21 to another or, in this case, from the line under "0" to the line under "1" and so on to the other lines at 2, 3, 4 and 5 throughout the limit of the dial's rotation. Thus the degree of rotation is denoted by the position of the indicator with respect to the said lines or marks 21.

In lieu of the numbered divisions of either dial 10 or 10' I may use various calibrations, if I desire, for the purpose of indicating capacity, wave-length or frequencies instead of merely indicating station positions as herein shown.

1. Dialing means for radio use including a rotatably mounted dial having progressively numbered divisions arranged thereon in a plurality of spiral turns about the center of mounting, a spiral abutment rotatable with the dial coextensive with the spiral turns and having substantially the same pitch as that of the spiral turns, a guide and an indicator mounted in the guide engaging the abutment, said indicator having radial movement across the dial adapted to abut upon each indicating number of said division 2. Radio dialing means including a rotating dial having station indicating characters thereon arranged in progressively increasing value throughout a plurality of complete spiral turns surrounding the dial center, a spirally formed abutment rotatable with the dial, the same being coextensive with and of substantially the same pitch as said spiral turns of characters, a guide, and an indicator mounted in the guide engaging the abutment, said indicator having movement radially across the dial due to said abutment and adapted to abut upon and follow the spiral turns of said characters throughout the several rotations of the dial.

3. A radio dialing mechanism including a condenser shaft, a dial-plate affixed to and revoluble with said shaft and provided with a continuous spiral abutment having a plurality of turns around the center of dial rotation, said dial-plate having indicated divisions arranged thereon in a spiral or scroll corresponding to that of the abutment, and an indicator mounted to traverse the dial radially, and engaging the spiral abutment of said dial plate, said indicator following in its radial movement the spirally arranged indicating divisions.

4. Dialing mechanism including a condenser-shaft, a mounted dial-plate adapted to rotate in the rotation of the shaft, said dial-plate having numbered divisions denoted thereon arranged in a spiral or scroll, the numbers of said divisions increasing in value toward the center of rotation, a spirally formed abutment on the face of the dial-plate, an indicator overlying the dial and engaging the abutment, the same adapted to be moved radially of said dial, and a mounting in which the indicator is guided.

5. Radio dialing mechanism including with the shaft of a condenser, a dial-plate fixed with respect to said shaft to rotate therewith, and having a series of equally spaced characters on its face to indicate station settings and arranged in a plurality of spiral turns, a spirally arranged abutment rotatable with the dial-plate, the same corresponding in direction and pitch to said turns, being substantially coextensive with the latter, a guide, and an indicator mounted in the guide engaging the abutment and extending between a given turn of said abutment and a corresponding turn of the said plurality of spiral turns of characters, following the spiral turns in the rotation of said dial-plate.

6. In a dial mechanism, the combination of a rotatable condenser shaft, a mounted dial rotatable with the shaft at the same rate therewith, said dial including numbered divisions arranged in a spiral, the numbers of the divisions increasing in value as they approach the center of rotation of said dial, a spirally formed abutment mounted to rotate with the shaft and dial at the same rate therewith and having the same pitch as that of the spirally arranged divisions, a guide, and an indicator mounted in the guide overlying the dial and engaging and moved by the said abutment.

7. In a dial mechanism, the combination with a condenser shaft, a dial-plate affixed thereto and having a spirally cut groove therein, a dial on said plate having numbered divisions arranged in a spiral conforming in pitch and direction to the said groove, a guide, and an indicator mounted in the guide and engaging in the groove and adapted to be moved across the dial in a radial direction.

8. Radio dialing means including a dial adapted to rotate having a series of characters on its face each of a different reading for indicating separate station settings arranged in a continuous spiral turn about the center of the dial's rotation, an indicator, means to rotate the dial, and a part on the dial engaged by the indicator and fashioned to advance the latter radially across the dial at a rate of travel in proportion to the advance of the readings of the said characters on the dial during rotation, and guide means for such indicator.

9. Radio dialing means including a dial adapted to rotate having a row of characters of constantly increasing value arranged thereon about its center of rotation in a number of spiral turns, an indicator and a mounting therefor, and a part on the dial with which the indicator engages and by which the latter is advanced through a given uniform distance of travel in a full revolution of said dial, said part also adapted to continuously and uniformly advance said indicator during other dial rotations in the same direction.

10. In combination, a revoluble radio dial having numerals arranged thereon in a plurality of spiral turns about a common point and disposed in continuous substantially regular spaced relation throughout, the same constantly increasing in value and all said numerals being arranged in grouped columns arranged radially of said dial, an indicator, a support including a guide for the indicator, said guide lying radially of said dial, and a part on the dial with which the indicator engages operable in the rotation of the dial for moving said indicator radially across said dial.

11. In combination, a revoluble dial having numerals arranged thereon in increasing value throughout a plurality of spiral turns about a common point, all said numerals being grouped in substantially evenly spaced columns arranged in radial lines on said dial, the numerals of the separate columns increasing in value consecutively by the addition of a chosen constant, an indicator, a support including a guide for the indicator, said guide lying radially of said dial, and a part on the dial with which the indicator engages operable in the rotation of the dial for moving said indicator radially across said dial.

12. In combination with the shaft of a radio condenser, a dial having station indicia arranged in spiral order thereon, an indicator adapted to move across the face of the dial in a substantially radial direction, a support including a guide for the indicator, said guide lying radially of said dial and an abutment on the dial with which the indicator engages, one of the two elements first named operatively engaging said shaft and adapted in the rotation of the latter movable one with respect to the other.

In testimony whereof I affix my signature

ERIC G. SHALKHAUSER.